US011514358B2

(12) United States Patent
Kim

(10) Patent No.: US 11,514,358 B2
(45) Date of Patent: *Nov. 29, 2022

(54) AUTOMATIC CONTROL ARTIFICIAL INTELLIGENCE DEVICE AND METHOD FOR UPDATING A CONTROL FUNCTION

(71) Applicant: LG ELECTRONICS INC., Seoul (KR)

(72) Inventor: Bongsang Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 336 days.

This patent is subject to a terminal disclaimer.

(21) Appl. No.: 16/454,859

(22) Filed: Jun. 27, 2019

(65) Prior Publication Data

US 2020/0005185 A1    Jan. 2, 2020

Related U.S. Application Data

(60) Provisional application No. 62/692,876, filed on Jul. 2, 2018, provisional application No. 62/690,360, filed on Jun. 27, 2018.

(30) Foreign Application Priority Data

Oct. 26, 2018   (KR) ................ 10-2018-0129184

(51) Int. Cl.
*G06N 20/00* (2019.01)
*G05B 19/4155* (2006.01)

(52) U.S. Cl.
CPC ......... *G06N 20/00* (2019.01); *G05B 19/4155* (2013.01); *G05B 2219/42018* (2013.01)

(58) Field of Classification Search
None
See application file for complete search history.

(56) References Cited

U.S. PATENT DOCUMENTS

2003/0074338 A1    4/2003  Young et al.
2008/0195236 A1    8/2008  Koo et al.
(Continued)

FOREIGN PATENT DOCUMENTS

JP    H06102902       4/1994
JP    2004193219      7/2004
(Continued)

OTHER PUBLICATIONS

Korean Intellectual Property Office Application No. 10-2018-0129219, Office Action dated Mar. 25, 2020, 4 pages.
(Continued)

*Primary Examiner* — David R Vincent
(74) *Attorney, Agent, or Firm* — Lee, Hong, Degerman, Kang & Waimey PC

(57) ABSTRACT

An artificial intelligence device is disclosed. In an embodiment, the artificial intelligence device includes a sensor configured to acquire an output value according to control of a control system, and an artificial intelligence unit comprising one or more processors configured to obtain one or more updated parameters of a control function of the control system based on the output value using reinforcement learning, and update the control function for providing a control value to the control system with the one or more updated parameters.

13 Claims, 7 Drawing Sheets

(56) References Cited

U.S. PATENT DOCUMENTS

| | | | |
|---|---|---|---|
| 2012/0046835 | A1 | 2/2012 | Matsumoto et al. |
| 2016/0187897 | A1 | 6/2016 | Peng et al. |
| 2017/0116511 | A1* | 4/2017 | Kim .................... H04L 12/2825 |
| 2017/0270434 | A1 | 9/2017 | Takigawa et al. |
| 2018/0100662 | A1* | 4/2018 | Farahmand ............ G06N 20/00 |

FOREIGN PATENT DOCUMENTS

| | | | |
|---|---|---|---|
| JP | 2008305157 | | 12/2008 |
| JP | 2008305157 A * | | 12/2008 |
| JP | 2009156502 | | 7/2009 |
| JP | 2010086405 | | 4/2010 |
| JP | 2011059870 | | 3/2011 |
| KR | 100866213 | | 10/2008 |
| KR | 101242678 | | 3/2013 |
| KR | 101242678 B1 * | | 3/2013 |

OTHER PUBLICATIONS

PCT International Application No. PCT/KR2019/007812, Written Opinion of the International Searching Authority dated Oct. 8, 2019, 8 pages.

PCT International Application No. PCT/KR2019/007810, Written Opinion of the International Searching Authority dated Oct. 11, 2019, 8 pages.

Shiromaru Isao, A Deviation Amount Compensation Program, Deviation Amount Compensation Device, and PID Control Output Compensation Device (Translation), Jun. 2007, Espacenet Machine Translation, 10 pages.

United States Patent and Trademark Office U.S. Appl. No. 16/454,816, Office Action dated Aug. 8, 2022, 30 pages.

* cited by examiner

AUTOMATIC CONTROL ARTIFICIAL INTELLIGENCE DEVICE AND METHOD FOR UPDATING A CONTROL FUNCTION

CROSS-REFERENCE TO RELATED APPLICATIONS

Pursuant to 35 U.S.C. § 119, this application claims the benefit of U.S. Provisional Application No. 62/690,360, filed on Jun. 27, 2018 and U.S. Provisional Application No. 62/692,876, filed on Jul. 2, 2018, and also claims the benefit of earlier filing date and right of priority to Korean Patent Application No. 10-2018-0129184, filed on Oct. 26, 2018, the contents of which are all hereby incorporated by reference herein in their entirety.

BACKGROUND OF THE INVENTION

1. Field of the Invention

The present invention relates to an artificial intelligence device for updating a control function for outputting a control value of a control system based on reinforcement learning.

2. Discussion of the Related Art

Artificial intelligence is a field of computer engineering and information technology involving studying how computers can think, learn and self-develop in ways similar to human intelligence such that computers can emulate intelligent actions of humans.

In addition, artificial intelligence does not exist by itself, but is directly or indirectly associated with other fields of computer science. In particular, many attempts have been made to introduce elements of artificial intelligence to various fields of information technology.

Meanwhile, feedback control may refer to control for configuring a closed loop to compare a control amount with a target value by feedback and to perform correction such that the control amount matches the target value. Such feedback control is widely used in home heating controllers using thermostats to large-scale industrial control systems used to control machines or processes.

Examples of widely used feedback control methods include proportional-integral-derivative control (hereinafter referred to as PID control). PID control is a combination of proportional control, integral control and derivative control, which acquires a current value of an object to be controlled, compares the current value with a set point (SP), calculates an error, and calculates a control value necessary for control using the error.

In PID control, the control value is calculated by a PID control function including a proportional term, an integral term and a derivative term, the proportional term is proportional to the error, the integral term is proportional to the integral of the error, and the derivative term is proportional to the derivative of the error.

The proportional term, the integral term and the derivative term may include a proportional gain parameter which is the gain of the proportional term, an integral gain parameter which is the gain of the integral term, and the derivative gain parameter which is the gain of the derivative term, respectively.

A PID parameter may include the gains of the respective terms included in the PID function. That is, the PID parameter may include a proportional gain parameter, an integral gain parameter and a derivative gain parameter.

Since the control value output from the control function depends on the PID parameter, it is important to set appropriate PID parameters in order to optimize system performance. However, conventionally, since PID parameters are directly set by humans based on human experience and intuition, it may be impossible to calculate an optimal parameter.

In addition, even if it is assumed that there is a person who has a lot of experience and excellent intuition and thus can calculate a near-optimal parameter, since an external environment differs according to a place where the control system is installed, the human experience and intuition are only applicable to a control system installed at a specific place and cannot be commonly used for all control systems.

Since experience and intuition significantly differ from person to person, even if a person who has a lot of experience and excellent intuition and thus can calculate a near-optimal parameter is a manager of a control system, the quality of the set parameter may deteriorate or greatly vary when the manager is replaced with a new manager.

In addition, as environmental conditions change throughout the year and due to other variables, an optimal PID parameter suitable for current environmental conditions may be changed. However, it is impossible to appropriately optimize the parameter according to change in environmental conditions with human intuition and experience.

SUMMARY OF THE INVENTION

An object of the present invention is to provide an artificial intelligence device for updating a control function for outputting a control value of a control system based on reinforcement learning.

According to an embodiment of the present invention, an artificial intelligence device includes a sensor configured to acquire an output value according to control of a control system; and an artificial intelligence unit comprising one or more processors configured to: obtain one or more updated parameters of a control function of the control system based on the output value using reinforcement learning; and update the control function for providing a control value to the control system with the one or more updated parameters.

In this case, the control function is a control function of feedback control, the control function including one or more parameters, and the artificial intelligence unit updates the one or more parameters based on the output value according to the control function.

In this case, the feedback control includes one of proportional-integral (PI) control, proportional-derivative (PD) control and proportional-integral-derivative (PID) control.

In one aspect, the artificial intelligence unit performs the reinforcement learning such that the output value follows a base line. In another aspect, the base line includes a first line indicating change in output value according to maximum control of the control system. In this case, the first line is an average rate of change of the output value according to the maximum control of the control system.

In one aspect, the artificial intelligence unit acquires the one or more parameters for enabling the output value to most closely follow the base line by providing a reward based on a gap between the base line and the output value. In another aspect, the base line further includes a second line matching a set value.

In one aspect, the artificial intelligence unit performs the reinforcement learning using a pattern of the output value in an environment in which the control system is installed. In this case, the artificial intelligence unit acquires the pattern of the output value by learning control information of the control system and the output value according to the control information of the control system in the environment, in which the control system is installed, using a recurrent neural network.

According to another embodiment of the present invention, a method for updating a control function includes acquiring an output value according to control of a control system; obtaining one or more updated parameters of a control function of the control system based on the output value using reinforcement learning; and updating a control function for providing a control value to the control system with the one or more updated parameters.

In this case, the control function is a control function of feedback control, the control function including one or more parameters, and the one or more parameters are updated based on the output value according to the control function.

In this case, the control function is updated by performing the reinforcement learning such that the output value follows a base line. In one aspect, the base line includes a first line indicating change in output value according to maximum control of the control system.

According to yet another embodiment of the present invention, an automatic control artificial intelligence device included in a heating, ventilation, air-conditioning (HVAC) system, includes: a sensor configured to sense a temperature which is an output value according to control of the HVAC system; a valve configured to control a flow rate of gas or liquid for temperature control of the HVAC system; and an artificial intelligence unit comprising one or more processors configured to: update a control function based on the output value using reinforcement learning; and control the valve to open or close according to a control value output from the updated control function. In one aspect, the base line may include a first line indicating change in the sensed temperature according to maximum control of the heating system. In another aspect, the base line may further include a second line matching a target temperature which is a set value of the heating system.

Meanwhile, the artificial intelligence unit may perform the reinforcement learning using a pattern of the temperature in an environment in which the heating system is mounted. In this case, the pattern of the temperature may be acquired by learning control information of the heating system and a temperature according to control information of the environment, in which the heating system is installed, by a recurrent neural network.

In yet another embodiment, a machine-readable non-transitory medium having stored thereon machine-executable instructions for updating a control function is disclosed, the instructions comprising: acquiring an output value according to control of a control system; obtaining one or more updated parameters of a control function of the control system based on the output value using reinforcement learning; and updating a control function for providing a control value to the control system with the one or more updated parameters.

DETAILED DESCRIPTION OF THE PREFERRED EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that if an element is referred to as being "connected with" or "coupled to" another element, the element can be directly connected with the other element or intervening elements may also be present. In contrast, if an element is referred to as being "directly connected with" or "directly coupled to" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
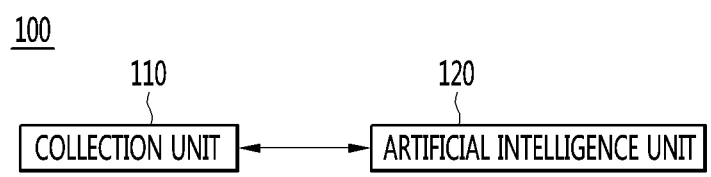
FIG. 1 is a block diagram illustrating an artificial intelligence device according to an embodiment of the present invention.

FIG. 1 is a block diagram illustrating an artificial intelligence device according to an embodiment of the present invention.

The term "automatic control artificial intelligence device" may be used interchangeably with the term "artificial intelligence device." The artificial intelligence device 100 according to an embodiment of the present invention may provide a control function to a control system.

The control system may correspond to systems which involve collecting a current value, outputting a control value using the collected current value, a set value, and a control function, and performing control according to the output control value. Examples of such control systems may include an air conditioning system, an energy management system, a motor control system, an inverter control system, a pressure control system, a flow rate control system, a cooling/heating system, and the like, which involve the aforementioned operations.

For example, in an air conditioning system, the current value may be a current temperature (that is, an output value according to a current setting of the air conditioning system, otherwise referred to generally as an existing control) and the set value may be a target temperature. In addition, an error or disparity between the current value and the set value may be input to a control function and the control function may calculate and provide a control value to the air conditioning system to achieve the set value. In this case, the air conditioning system may perform control according to the control value, that is, may change a setting of the air conditioning system according to the control value.

As another example, in an energy management system, the current value may be a current charge amount of an energy storage (that is, an output value according to a current setting of the energy management system, otherwise referred to generally as an existing control) and the set value may be a target charge amount. In addition, an error or disparity between the current value and the set value may be input to a control function, and the control function may calculate and provide a control value to the energy management system. In this case, the energy management system may perform control according to the control value, that is, may change a setting of the energy management system to control the charge amount according to the control value.

As another example, in a motor control system, the current value may be a current motor speed (that is, an output value according to a currently setting of the motor control system, otherwise referred to generally as an existing control) and the set value may be a target motor speed. In addition, an error or disparity between the current value and the set value may be input to a control function, and the control function may calculate and provide a control value to the motor control system. In this case, the motor control system may perform control according to the control value, that is, may change a setting of the motor control system to control the motor speed according to the control value.

According to an embodiment, the artificial intelligence device may include a collection unit 110 and an artificial intelligence unit 120. The collection unit 110 may acquire a detected, sensed, observed, or received value, otherwise referred to as an output value, according to a control of a control system. Here, the output value according to control of the control system may mean a detected, observed, or received state which is resulting or is based on control by the control system.

For example, the object or condition to be controlled by the air conditioning system may be a temperature and the output value according to control of the control system may refer to an observed or detected temperature resulting from or based on temperature control of the air conditioning system.

As another example, the object or condition to be controlled by the motor control system may be the speed of the motor and the output value according to control of the control system may refer to the speed of the motor resulting from or based on speed control of the motor control system.

The output value according to control of the control system may be considered as a current value. That is, a feedback control loop may be configured by setting the output value of the control system as the current value and inputting the error or disparity between the current value and the set value to the control function. The output value may be directly detected, sensed, observed, or received by the artificial intelligence device or received from another system or device.

In one embodiment, the collection unit 110 may include a sensing unit for sensing the output value. In various embodiments, the sensing unit may be implemented as a hardware sensor or the like, such as a temperature thermostat, a pressure sensor, a hardware motor speed sensor, and the like. For example, when the object or condition to be controlled is a temperature, the collection unit 110 may include a hardware temperature sensor such as a thermostat and when the object or condition to be controlled is pressure, the collection unit 110 may include a hardware pressure sensor.

When the artificial intelligence device 100 and the control system are separately configured, the control system may sense the output value, and the collection unit 110 of the artificial intelligence device 100 may receive the output value from the control system. In this case, the collection unit 110 may include a communication unit, such as a modem or hardware transceiver, for communicating with the control system.

Even when the artificial intelligence device 100 and the control system are separately configured, in addition to the control system sensing the output value, the collection unit 110 may also detect, sense, observe, or otherwise receive the output value.

Although not shown in drawings, in one embodiment, the artificial intelligence device 100 may also include a storage unit, such as a hardware memory device. A control function, a pattern or history of an output value, an application program corresponding to machine-executable instructions for performing reinforcement learning, an application program corresponding to machine-executable instructions for performing learning time-series data using a recurrent neural network, and the like, may be stored in the storage unit.

An example of a control method of the control system will be briefly described. The control function implemented in embodiments of the present invention may be a control function of feedback control, which includes one or more parameters.

Terms used in the present invention will be described using the PID control function known to those or ordinary skill, for example as shown in Equation 1.

$$u(t) = K_p e(t) + K_i \int_0^t e(\tau)d\tau + K_d \frac{de(t)}{dt} \qquad \text{[Equation 1]}$$

PID control is a control loop feedback mechanism widely used in an industrial control system. As discussed, PID control is a combination of proportional control, integral control and derivative control, which acquires a current value of an object or condition to be controlled, compares the current value with a set point (SP), calculates an error's e(t) and calculates a control value (CV) u(t) necessary for control using the error.

For example, in a heating system, the current value is a current temperature, the set point (SP) is a target temperature, and the error e(t) may be a difference between the current temperature and the target temperature.

Further, in PID control, the control value (CV) u(t) may be calculated by a PID control function including a proportional term $K_p e(t)$, an integral term $K_i \int_0^t e(r)dr$ and a derivative term $$K_d \frac{de(t)}{dt}.$$

In this case, the proportional term $K_p e(t)$ is proportional to the error e(t), the integral term $K_i \int_0^t e(r)dr$ is proportional to the integral of the error e(t), and the derivative term $$K_d \frac{de(t)}{dt}$$

is proportional to the derivative of the error e(t).

In addition, the proportional term, the integral term and the derivative term may include a proportional gain parameter $K_p$ which is gain of the proportional term, an integral gain parameter $K_i$ which is gain of the integral term and a derivative gain parameter $K_d$ which is gain of the derivative term, respectively.

The PID parameters of the gains of the terms are included in the PID function. That is, the PID parameter may include the proportional gain parameter $K_p$, the integral gain parameter $K_i$ and the derivative gain parameter $K_d$.

Output of the PID controller is the control value (CV) u(t), and the control value u(t) may be used as an input of the control system. In other words, the control value u(t) may mean a manipulated variable (MV).

In addition, the control system may perform control corresponding to the control value u(t). For example, in a heating system, when a control value u(t) of 80% is output by the control function, the heating system may perform control corresponding to the control value u(t) of 80% which is input to the control system. For example, the 80% control value may correspond to an instruction for opening a valve or duct by 80%, or increasing a fan speed of the air conditioning system by 80%.

As discussed, the output value according to control of the control system may refer to a sensed or observed state resulting from control by the control system. The output value may correspond to a process variable (PV).

In various embodiments, the artificial intelligence unit 120 may update a control function for providing a control value to the control system based on reinforcement learning. Reinforcement Learning refers to the theory that an agent can determine an optimal course based on experience without specific input data, where the agent is provided an environment in which the agent can work toward a cumulative reward.

Reinforcement Learning may be performed by a Markov Decision Process (MDP) well known in the art, which will be briefly described. First, an environment including information necessary for the agent to take a next action is given. Second, what action is taken by the agent in that environment is defined. Third, a reward given to the agent when the agent successfully takes a certain action and a penalty given to the agent when the agent fails to take a certain action are defined. Fourth, experience is repeated until a future reward reaches a maximum point, thereby deriving an optimal action policy.

Embodiments of the present invention may include algorithms according to the Markov Decision Process (MDP) implemented at the artificial intelligence unit 120.

For example, first, an environment in which the output value or the pattern of the output value is provided is given to the artificial intelligence unit 120, such that the artificial intelligence unit 120 updates the control function. Second, action of the artificial intelligence unit 120 is defined such that the output value follows the base line in order to achieve a goal with respect to the output value. Third, a reward is given as the artificial intelligence unit follows the base line. Fourth, the artificial intelligence unit 120 repeats learning until the reward is maximized, thereby deriving an optimal control function.

In this case, the artificial intelligence unit 120 may update the feedback control function based on the output value according to the control function. Specifically, when the control system performs control corresponding to the control value received from the control function, the artificial intelligence unit 120 may update one or more parameters of the feedback control function such that a goal output value is achieved according to control of the control system.

Thus, the artificial intelligence unit 120 may change the parameter of the control function, acquire the state (output value) and the reward resulting from control of the control function, and acquire a policy for maximizing the reward. In this case, the goal achieved by the artificial intelligence unit 120 may be set by a point at which the reward is given, the magnitude of the reward, etc.

The artificial intelligence unit 120 may variously change the parameter of the control function using a trial-and-error method. When the output value is acquired according to the control function having the changed parameter, the reward may be given to the acquired output value, thereby acquiring a policy for maximizing the reward.

Meanwhile, a best policy achieved by the artificial intelligence unit 120 is preset by reinforcement learning, and when the artificial intelligence unit 120 takes an action to follow the best policy, the amount of learning required of the artificial intelligence unit 120 can be significantly reduced. Accordingly, it is possible to preset the best policy achieved by the artificial intelligence unit 120 by reinforcement learning. In this case, the best policy achieved by the artificial intelligence unit 120 may refer to an ideal change of the output value according to control of the control system. The ideal change of the output value according to control of the control system may be referred to as a base line. The artificial intelligence unit 120 may update the control function for providing the control value to the control system, such that the output value according to control of the control system follows the base line. This will be described in detail with reference to FIG. 2.

Figure 2:
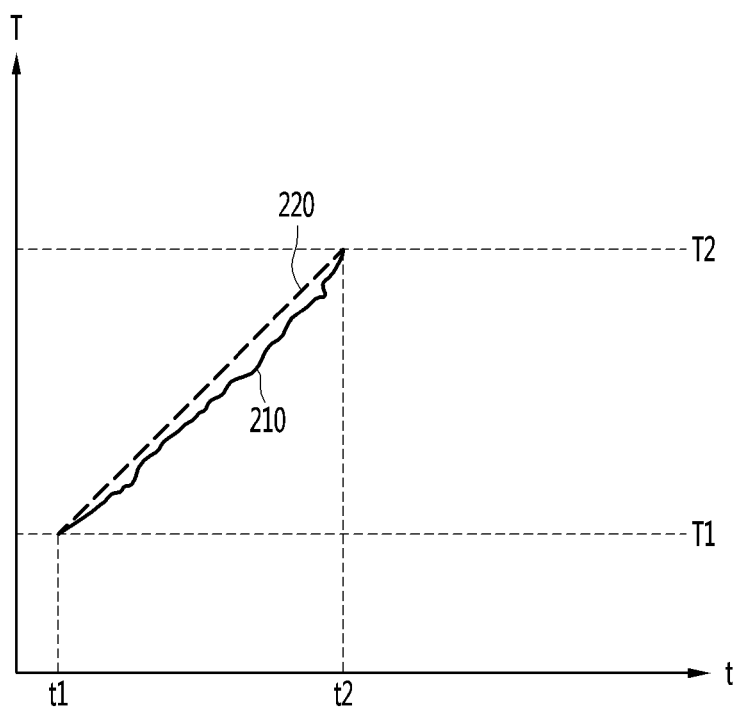
FIG. 2 is a diagram illustrating a method of setting a base line according to an embodiment of the present invention.

FIG. 2 is a diagram illustrating a method of setting a base line according to an embodiment of the present invention. The base line may include a first line indicating change in output value according to maximum control of the control system. Specifically, the first line may indicate change in output value obtained when the control system performs maximum control according to the maximum control value of the control function.

For example, in a heating system, when a maximum control value of 100% is output by the control function, the heating system may perform control corresponding to the control value of 100%, that is, control of opening the valve by 100%. In this case, the first line may mean change in temperature, which is the object or condition to be controlled, when a fan speed is changed or a valve or duct of the heating system is opened by 100%. A line 210 representing the output value according to maximum control value of the control system may be set as the first line.

However, the present invention is not limited thereto and a line 220 corresponding to the average rate of change of the output value according to maximum control of the control system may be set as the first line.

For example, when the heating system starts operation at a first temperature T1 at a first point in time t1 and performs maximum control to reach a second temperature T2 at a second point of time t2, the first line may indicate the average rate of change of the temperature from the first point of time t1 to the second point of time t2.

In some embodiments, the artificial intelligence unit 120 may control the control system according to the first line such that the control system performs maximum control in the environment in which the control system is installed.

For example, if the control system is a valve system for supplying water for heating a pipe of a specific room of a building, the artificial intelligence device 120 may control the valve system for supplying water for heating to the pipe of the specific room to maximally open the valve. If the artificial intelligence device 100 and the control system are separately configured, the artificial intelligence unit 120 may transmit a control command for instructing the control system to perform maximum control to the control system. In contrast, if the artificial intelligence device 100 and the control system are integrally configured, the artificial intelligence unit 120 may directly control an operation unit to perform maximum control.

Figure 3:
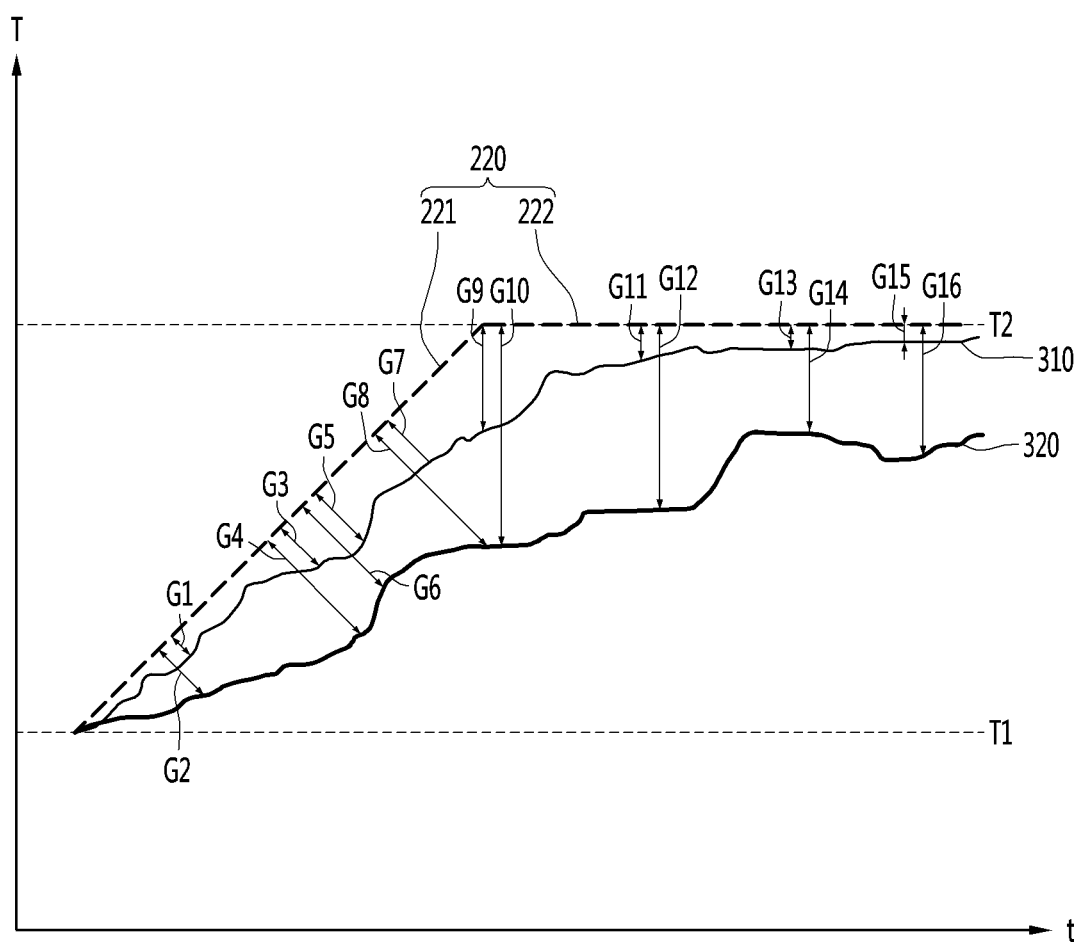
FIG. 3 is a diagram illustrating a method of performing reinforcement learning such that a second line and an artificial intelligence unit follow a base line according to an embodiment of the present invention.

While the control system performs maximum control, the artificial intelligence unit 120 may acquire the output value according to maximum control of the control system. In addition, the artificial intelligence unit 120 may set the first line based on the acquired output value. FIG. 3 is a diagram illustrating a method of performing reinforcement learning such that a second line and an artificial intelligence unit follow a base line according to an embodiment of the present invention.

The first line 221 of the base line 220 refers to change in output value according to maximum control of the control system as described with reference to FIG. 2. Here, setting the first line 221 may serve to provide artificial intelligence unit 120 with a goal of rapidly reaching a set value. The base line 220 may further include a second line 222. Setting the second line 222 may serve to provide the artificial intelligence unit 120 with a goal of reducing overshoot of the output value or fluctuation of the output value above or below the set value after reaching the set value. Accordingly, the second line 222 may match the set value. Here, the set value may be a target value of the output value when a specific operation is performed.

For example, when the current temperature is 24° C. and a command for increasing the temperature to 30° C. is received, the control system may perform operation for increasing the temperature to 30° C. In this case, the artificial intelligence unit 120 may set the base line including the first line (indicating the average rate of change of the temperature when the control system performs maximum control) and the second line for increasing the temperature to 30° C.

As another example, when the current temperature is 24° C. and a command for increasing the temperature to 27° C. is received, the control system may perform operation for increasing the temperature to 27° C. In this case, the artificial intelligence unit 120 may set the base line including the first line (indicating the average rate of change of the temperature when the control system performs maximum control) and the second line for increasing the temperature to 27° C.

Meanwhile, the artificial intelligence unit 120 may perform reinforcement learning such that the output value according to control of the control system follows the base line 220. Here, following the base line may mean that the output value according to control of the control system most closely approaches the base line 220.

In addition, the artificial intelligence unit 120 may perform reinforcement learning such that the output value according to control of the control system follows the base line 220, thereby acquiring one or more parameters of the control function. Specifically, the artificial intelligence unit 120 may acquire output values 310 and 320 while variously changing the parameters of the control function in a trial-and-error manner.

In addition, the artificial intelligence unit 120 gives a reward based on a gap between the base line 220 and the output value 310, 320, thereby acquiring one or more parameters for enabling the output value according to control of the control system to most closely follow the base line 220. Specifically, the artificial intelligence unit 120 may calculate a gap or disparity between the base line 220 and the output value 310, 320 at one or more points or all points.

As the gap between the base line 220 and the output value 310, 320 is decreased, the given reward may be increased. In this way, the artificial intelligence unit 120 may acquire one or more parameters of the control function for maximizing the reward.

For example, assume that the output value obtained from the control function including a first parameter is a first output 310 and the output value obtained from the control function including a second parameter is a second output 320.

Gaps G1, G3, G5, G7, G9, G11, G13 and G15 between the first output value 310 and the base line 220 may be smaller than gaps G2, G4, G6, G8, G10, G12, G14 and G16 between the second output value 320 and the base line 220. Thus, the reward given when the first parameter is used is greater than the reward given when the second parameter is used. In this case, the artificial intelligence unit 120 may determine the first parameter as the parameter for enabling the output value to most closely follow the base line. In this manner, the artificial intelligence unit 120 may continuously perform reinforcement learning, thereby acquiring control function parameters for enabling the output value according to control of the control system to most closely follow the base line.

When a new parameter is determined as optimal, the artificial intelligence unit 120 may change the parameter of the existing control function to the newly determined parameter, thereby updating the existing control function.

Meanwhile, the gaps G1, G3, G5, G7, G9, G11, G13 and G15 shown in FIG. 3 indicate the distances between the output value and the base line at several points and are merely exemplary. Additionally, the gap between the output value and the base line may refer to the area of a space between the output value and the base line. That is, the area of the space between the first output value 310 and the base line 220 when the first parameter is used may be smaller than that of the space between the second output value 320 and the base line 220 when the second parameter is used. In this case, a reward given when the first parameter is greater than a reward given when the second parameter is used. The artificial intelligence unit 120 may determine the first parameter as the optimal parameter for enabling the output value to most closely follow the base line.

The output value according to control of the control system is not only determined by control of the control system, but also may be determined by various variables.

For example, in the heating system, the output value according to control of the control system is determined by various variables such as a current season, weather, time, date, the area of a space to be heated, whether a window is opened, the number of persons in the space, whether a door is opened, whether an insulator is used, and the like.

Thus, in embodiments of the present disclosure, a learning environment is provided to an artificial intelligence agent, also referred to as an artificial intelligence unit, and the artificial intelligence agent learns a large amount of data used to determine an optimal parameter of a control function regardless of various variables for determining the output value.

In an operating environment of the control system, in which there are various variables and a set value may be changed whenever operation is performed, how to set the goal of the artificial intelligence agent may come into question. However, embodiments of the present disclosure may provide a clear goal of following the base line to the artificial intelligence agent and the artificial intelligence agent may perform learning such that the gap between the base line and the output value is minimized, thereby reinforcing learning ability and learning speed of the artificial intelligence agent.

In some examples, the first line of the base line may indicate the output value according to maximum control of the control system and the second line of the base line indicates the set value of a specific operation. Accordingly, according to embodiments of the present disclosure, a goal of rapidly reaching a set value and a goal of stabilizing a system such as reduction of overshoot or fluctuation of an output value are simultaneously given to the artificial intelligence agent.

In addition, even when the same control system performs the same operation, the output value may be changed according to other factors such as where the control system is installed. For example, while a valve or duct of a heating system may be operated with a same setting value of 80%, where one system is installed in a hot climate location such as Thailand during a summer season and where another system is installed in a cold climate location such as Russia during a winter season, the average rates of change of the output value of the two heating systems may be different.

As another example, the average rate of change of the output value in a first building with good insulation may be different from the average rate of change of the output value in a second building with poor insulation despite being operated using the same control system and parameters.

However, the first line of the present invention is set based on the output value by maximum control in an environment in which the control system is installed. That is, the first line is set according to the characteristics of the environment in which the control system is installed and the artificial intelligence agent performs reinforcement learning in order to cause the output value to follow and approach the first line. Therefore, according to embodiments of the present disclosure, an optimal control function is determined which is suitable for an environment in which the control system is installed.

Figure 4:
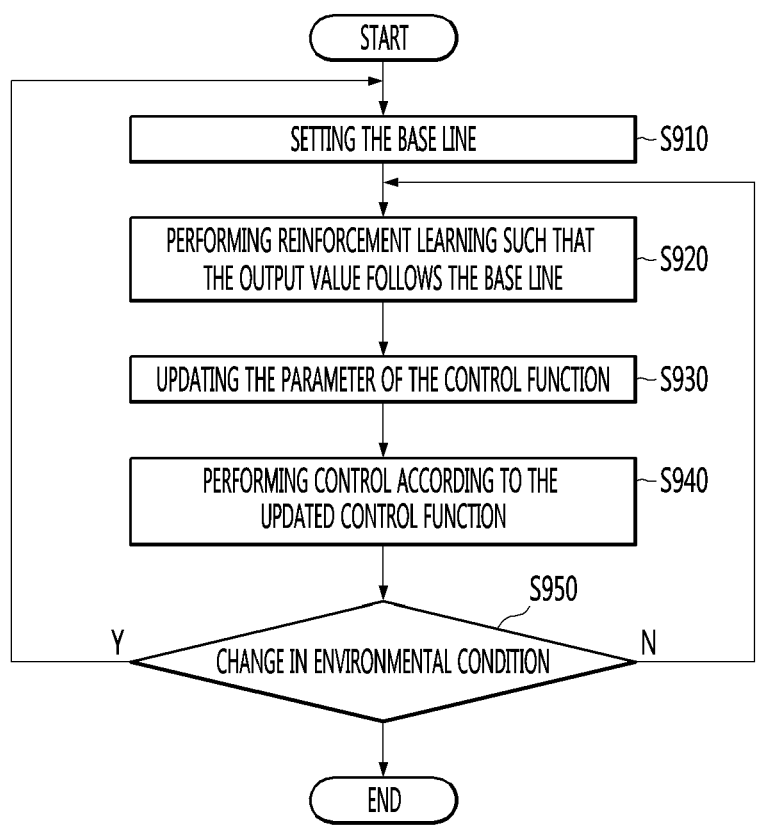
FIG. 4 is a flowchart illustrating an operation method of an artificial intelligence device and a control system according to an embodiment of the present invention.

FIG. 4 is a flowchart illustrating an operation method of an artificial intelligence device and a control system according to an embodiment of the present invention.

At block S910, the artificial intelligence unit 120 may set the base line (S910), as discussed above. Specifically, the artificial intelligence unit 120 may control the control system to perform maximum control. In addition, the artificial intelligence unit 120 may set the base line according to the output value acquired while the control system performs maximum control.

When the base line is set, the artificial intelligence unit 120 may perform reinforcement learning such that the output value according to control of the control system follows the base line (S920). The artificial intelligence unit 120 may variously change the parameter of the control function and provide the control function with the changed parameter to the control system. In this case, the control system may perform control according to the control function received from the artificial intelligence unit 120. For example, the control system may input the current value and the set value to the control function received from the artificial intelligence unit 120, thereby calculating the control value. In addition, the control system may perform control according to the calculated control value.

In this case, the artificial intelligence unit 120 may acquire the output value according to control of the control system. In addition, the artificial intelligence unit 120 may acquire the parameter for most closely following the base line using the acquired output value and the parameter used to acquire the output value.

Further, the artificial intelligence unit 120 may update the parameter of the control function (S930). For example, when the parameter for most closely following the base line is acquired, the artificial intelligence unit 120 may change the existing control function to a control function including the newly acquired parameter. Then, the control system may perform control according to the updated control function (S940). That is, since the parameter for most closely following the base line is acquired through reinforcement learning, the control system may perform control according to the updated control function. When it is determined that the environmental condition is not changed (S950, N), the artificial intelligence unit 120 may repeat operations S920 to S940 to continuously repeat the process of finding the optimal parameter based on the same base line. Meanwhile, when it is determined that the environmental condition is changed (S950, Y) (or when change in environmental condition is equal to or greater than a predetermined value), the artificial intelligence unit 120 may reset the base line (S910). In addition, the artificial intelligence unit 120 may repeat S920 to S940 to continuously repeat the process of finding the optimal parameter based on the newly set base line.

Figure 5:
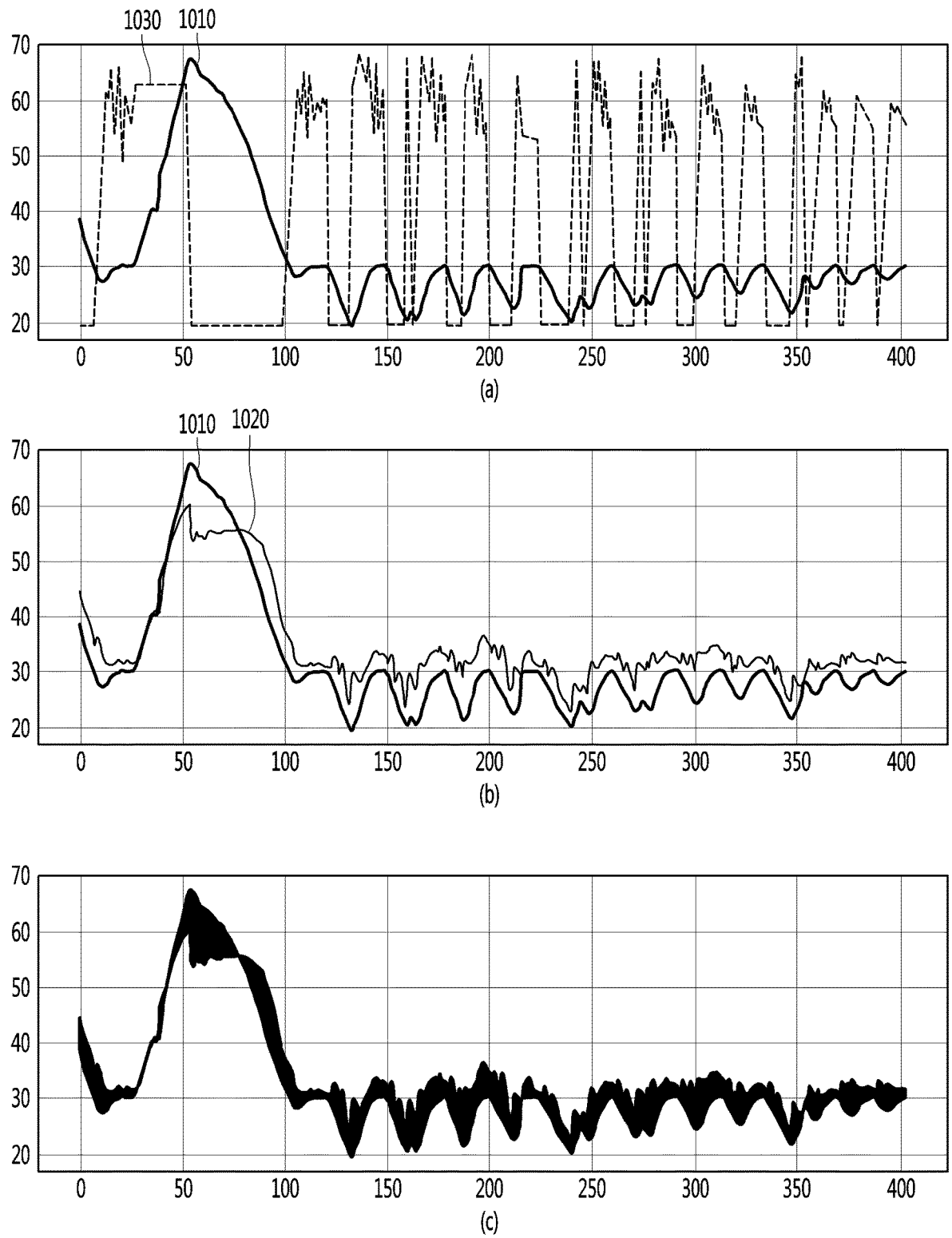
FIG. 5 is a diagram illustrating a method of pre-learning a pattern of an output value according to an embodiment of the present invention.

FIG. 5 is a diagram illustrating a method of pre-learning a pattern of an output value according to an embodiment of the present invention. The pattern of the output value may refer to change in the output value according to control of the control system. For example, the pattern of the output value in a heating system may indicate how the temperature according to control of the heating system is changed when a valve of the heating system is opened by a predetermined degree or amount. Meanwhile, change in the output value according to control of the control system may refer to a current behavior (that is, current control) affecting a next step (output value) and a behavior at the next step (control using the current output value) affects a subsequent step (output value) thereof.

Accordingly, the artificial intelligence unit 120 may learn the pattern of the output value using a recurrent neural network (RNN) for learning data changed over time, such as time-series data. In this case, a long-short term memory (LSTM) method may be used. Meanwhile, the artificial intelligence unit 120 may learn the control information of the control system and the output value according to the control information in a particular environment in which the control system is installed, using the RNN. For example, the data learned using the RNN may be time-series data of the control information and the output value according to the control information in the environment, in which the control system is installed. For example, in the heating system, the data learned using the RNN may be time-series data of the temperature according to the degree of opening of the valve and in particular the degree of opening of the valve in the environment in which the heating system is installed. In this case, the artificial intelligence unit 120 may learn data for a predetermined period using the RNN to acquire the pattern of the output value.

Meanwhile, the RNN may be included in the artificial intelligence unit 120 and the artificial intelligence unit 120 may directly acquire the pattern of the output value using the RNN, or an external device including the RNN may acquire the pattern of the output value and then the artificial intelligence device 100 may store the pattern of the output value in a storage unit.

FIG. 5(*a*) shows past control information for a setting, such as an amount of valve opening of a heating system, 1030 and an output value (for example, temperature) 1010 according to the control information at a specific environment where the heating system is installed.

FIG. 5(*b*) shows the result following the artificial intelligence unit 120 learning the past control information for the setting (for example, valve opening) 1030 and the output value (for example, temperature) 1010 according to the control information at the specific environment where the heating system is installed using the RNN, and predicting temperature change 1020 based on the result of learning and current control information.

In FIG. 5(*c*), substantial similarity is shown between the past temperature change 1010 and the predicted temperature change 1020, where a rate of concordance of 95.49% is achieved.

Figure 6:
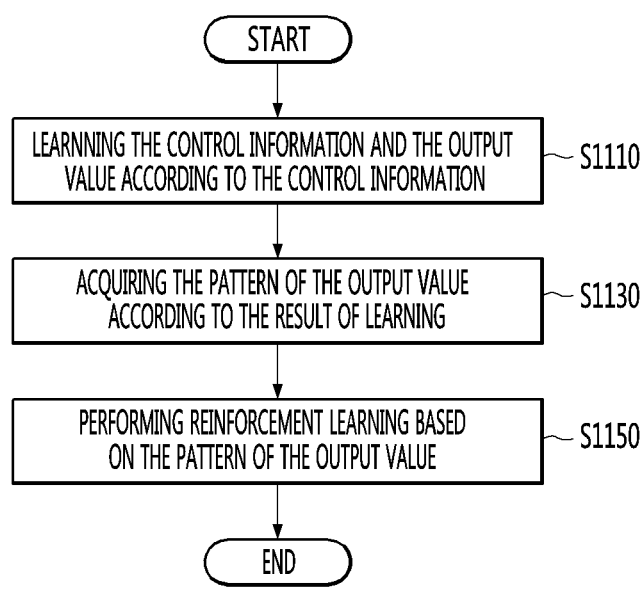
FIG. 6 is a flowchart illustrating a method of acquiring the pattern of an output value using a recurrent neural network and a method of performing reinforcement learning based on the pattern of the output value.

FIG. 6 is a flowchart illustrating a method of acquiring the pattern of an output value using a recurrent neural network and a method of performing reinforcement learning based on the pattern of the output value according to an embodiment of the present disclosure.

The artificial intelligence unit 120 may learn the control information of the control system and the output value according to the control information in the environment, in which the control system is installed, using the RNN (S1110). For example, the artificial intelligence unit 120 may learn the control information and the output value of the control information in the environment, in which the control system is installed, for a particular period.

For example, if the artificial intelligence unit 120 will be installed in the heating system of a building A, the artificial intelligence unit 120 may learn historical log data obtained by recording the control information of the heating system of the building A and the temperature according to the control information for a particular period of time, such as one year, using the RNN.

In this case, the artificial intelligence unit 120 may acquire the pattern of the output value according to the result of learning (S1130). Further, the artificial intelligence device, in which the result of learning is stored in the storage unit, may be connected to the control system to provide the control function to the control system to perform reinforcement learning. In this case, the artificial intelligence unit 120 may perform reinforcement learning based on the pattern of the output value (S1150). Further, the artificial intelligence unit 120 may perform reinforcement learning while variously changing a parameter of the control function in a trial-and-error manner. In this case, the pattern of the output value may be provided as an environment provided to the agent in reinforcement learning. That is, when the pattern of the output value is not learned using the RNN, since the output value is detected or observable form the environment provided to the agent, it is possible to increase a time required to perform reinforcement learning.

However, when the pattern of the output value is pre-learned using the RNN, the time required to perform reinforcement learning may be significantly decreased. For example, when the artificial intelligence device 100 is sold and installed at a specific location, the seller of the artificial intelligence device 100 may obtain and pre-learn the historical log data of the specific location and install the artificial intelligence device 100 with the pre-learned data already stored therein. Therefore, it is possible to improve a reinforcement learning speed.

In other aspects of the present disclosure, the pattern of the output value may be updated. For example, the artificial intelligence device 100 may learn the control information and the output value according to the control information for a particular period of time, such as the previous year in the environment, in which the control system is installed through the recurrent neural network, thereby acquiring the pattern of the output value.

As another example, the pattern of the output value acquired by learning the control information and the output value according to the control information for the previous year in the environment, in which the control system is installed, through the recurrent neural network may be stored in the artificial intelligence device 100. In this case, the artificial intelligence unit 120 may periodically update the pattern of the output value. For example, on Jul. 1, 2018, the log data from Jul. 1, 2017 to Jun. 30, 2018 may be learned and the pattern of the output value may be updated. Thereafter, on Aug. 1, 2018, the log data from Aug. 1, 2017 to Jul. 30, 2018 may be learned and the pattern of the output value may be updated. Thus, the pattern of the output value may be changed over time. For example, the weather may gradually become warmer based on various factors such as global warming, or heating performance may become worse due to built-up of sediment or debris in a heating pipe over time.

Figure 7:
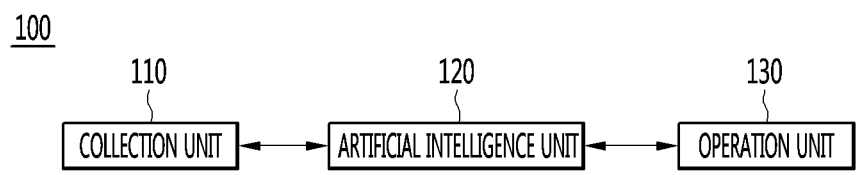
FIG. 7 is a diagram showing an artificial intelligence device configured by combining a control system, a collection unit and an artificial intelligence unit according to an embodiment of the present invention.

FIG. 7 is a diagram showing an artificial intelligence device configured by combining a control system, a collection unit, and an artificial intelligence unit according to an embodiment of the present invention.

The artificial intelligence device 100 may include a collection unit 120, an artificial intelligence unit 110 and an operation unit 130. For the collection unit 120 and the artificial intelligence unit 110, reference is made to the collection unit and the artificial intelligence unit of FIG. 1, and discussion is omitted here.

Although not shown in drawings, the artificial intelligence device 100 may further include a storage unit, such as a hardware memory. The storage unit may store information corresponding to instructions for execution of a control function, a pattern of an output value, an application program for reinforcement learning, and an application program for learning time-series data using a recurrent neural network.

Meanwhile, the operation unit 130 may include components according to the function of the control system. Specifically, the control system may refer to all systems for collecting a current value, outputting a control value using the collected current value, a set value, and a control function, and performing control according to the output control value, such as an air conditioning system, an energy management system, a motor control system, an inverter control system, a pressure control system, a flow rate control system, a heating/cooling system, and the like.

For example, if the control system is a heating system, the collection unit 120 may include a temperature sensor. An operation unit 130 may include a valve for controlling flow of water for heating and a device for controlling the degree of opening of the valve under control of the artificial intelligence unit 110. In this case, the artificial intelligence unit 120 may control the operation unit 130 to perform maximum control (open the valve by 100%) and set the base line using the output value acquired when maximum control is performed. In addition, the artificial intelligence unit 120 may input a current temperature and a target temperature to a control function to output a control value, open the valve according to the output control value, and perform reinforcement learning such that the temperature acquired by opening the valve follows the base line. Further, the artificial intelligence unit 120 may update the parameter of the control function according to the result of reinforcement learning.

Figure 8:
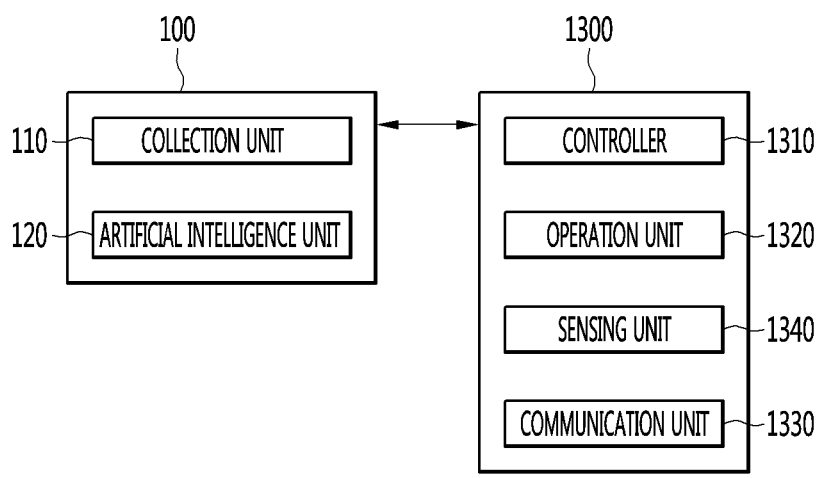
FIG. 8 is a block diagram illustrating an embodiment in which a control system and an artificial intelligence device are separately configured and the artificial intelligence device collects an output value according to an embodiment of the present invention.

FIG. 8 is a block diagram illustrating an embodiment in which a control system and an artificial intelligence device are separately configured according to an embodiment of the present invention.

The artificial intelligence device 100 may include a collection unit 110 and an artificial intelligence unit 120. For the collection unit 110 and the artificial intelligence unit 120, reference is made to the collection unit and the artificial intelligence unit of FIG. 1.

Although not shown in drawings, the artificial intelligence device 100 may further include a storage unit, such as a hardware memory. The storage unit may store a control function, a pattern of an output value, an application program for reinforcement learning and an application program for learning time-series data using a recurrent neural network.

Meanwhile, a control system 1300 may include a controller 1310, an operation unit 1320, a communication unit 1330 and a sensing unit 1340. Although not shown in drawings, the control system 1300 may further include a storage unit, such as a hardware memory. The storage unit of the control system 1300 may store an application program for driving the operation unit 1320, a control function, etc.

The sensing unit 1340 may sense the output value according to control of the control system. The controller 1310 may control overall operation of the control system 1300. The communication unit 1330 of the control system 1300 and the collection unit 120 of the artificial intelligence device 100 may be connected to each other to perform communication, such as wired communication or wireless communication via one or more wireless interfaces such as a hardware modem, with each other. For example, the artificial intelligence unit 120 may transmit a control command for enabling the operation unit 1320 to perform maximum control (open the valve by 100%) to the control system 1300 through the collection unit 110. In this case, the controller 1310 may perform maximum control and transmit, to the artificial intelligence device 100, the output value acquired when maximum control is performed. In this case, the artificial intelligence unit 110 may set the base line using the output value acquired when the control system 1300 performs maximum control. The controller 1310 may perform control based on the control value provided by the control function. Specifically, the controller 1310 may input a current value and a set value to a control function to output a control value, perform control according to the output control value, and sense the output value obtained by performing control through the sensing unit 1340. When the output value is sensed, the controller 1310 may input the sensed output value and the set value to the control function to output the control value, perform control according to the output control value and sense the output value obtained by performing control through the sensing unit 1340. That is, the controller 1310 may perform a control loop feedback mechanism. The controller 1310 may transmit the control information of the control system and the output value sensed by the sensing unit 1340 to the artificial intelligence device 100 through the communication unit 1330. Meanwhile, the artificial intelligence unit 110 may perform reinforcement learning such that the output value according to control of the control system 1300 follows the base line. When a new parameter needs to be learned, the artificial intelligence unit 110 may transmit the control function including the new parameter to the control system 1300. In this case, the control system 1300 may perform control using the received control function, sense the output value according to control of the control system 1300, and transmit the output value to the artificial intelligence device 100.

Meanwhile, when a new parameter is acquired according to the result of reinforcement learning, the artificial intelligence unit 110 may update the existing control function to a control function including a new parameter. The artificial intelligence unit 110 may transmit the updated control information to the control system 1300. In this case, the control system 1300 may perform control using the updated control function.

Figure 9:
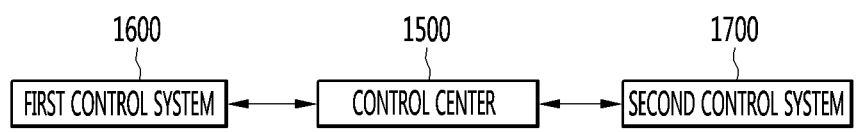
FIG. 9 is a block diagram illustrating an embodiment in which artificial intelligence devices respectively corresponding to a plurality of control systems are integrally configured in a control center according to an embodiment of the present invention.

FIG. 9 is a block diagram illustrating an embodiment in which artificial intelligence devices respectively corresponding to a plurality of control systems are integrally configured in a control center according to an embodiment of the present invention.

For example, the control center 1500 may be a device, such as a computer terminal, for integrally managing heating systems of a specific building. A first control system 1600 may be a control device, for example implemented as a computer terminal, for controlling heating of a first space of the specific building and a second control system 1700 may be a control device, for example implemented as a computer terminal, for controlling heating a second space of the specific building.

The first control system 1600 may include a hardware controller, an operation unit, a communication unit, and a sensing unit. The description of the controller, the operation unit, the communication unit and the sensing unit shown in FIG. 8 is applicable to the first control system 1600 shown in FIG. 9, where the communication unit communicates with the control center 1500.

In addition, the second control system 1700 may include a hardware controller, an operation unit, a communication unit and a sensing unit. The description of the controller, the operation unit, the communication unit and the sensing unit shown in FIG. 8 is also applicable to the second control system 1700 shown in FIG. 9, except that the communication unit communicates with the control center 1500.

The control center 1500 may include a collection unit and an artificial intelligence unit. The description of the collection unit and the artificial intelligence unit shown in FIG. 8 is applicable to the collection unit and the artificial intelligence unit of the control center 1500 shown in FIG. 9.

Meanwhile, the artificial intelligence unit of the control center 1500 may receive an output value according to control of the first control system 1600 from the first control system 1600 and update a first control function for providing a control value to the first control system 1600 based on reinforcement learning.

In addition, the artificial intelligence unit of the control center 1500 may receive an output value according to control of the second control system 1700 from the second control system 1700 and update a second control function for providing a control value to the second control system 1700 based on reinforcement learning.

Moreover, the artificial intelligence unit of the control center 1500 may reset the base line of the first control system 1600 using an environmental condition acquired by the second control system 1700. For example, when change in environmental condition is sensed via the sensing unit of the second control system 1700, the artificial intelligence unit of the control center 1500 may reset the base line of the first control system 1600. That is, the sensed information acquired by the second control system 1700 may be used to update the control function of the first control system 1600.

Although the PID is used as a control function in the above description, the present invention is not limited thereto. For example, the control function may include one of proportional-integral (PI) control, proportional-derivative (PD) control and proportional-integral-derivative (PID) control. In addition, the control function may include all types of functions for providing the control value to the control system in order to perform feedback control.

Meanwhile, a heating system, to which the present invention is applicable, will be described. The artificial intelligence device according to an embodiment of the present invention may be included in the heating system. The artificial intelligence device according to an embodiment of the present invention may include a collection unit, an operation unit, and an artificial intelligence unit. In this case, the collection unit may include a temperature sensor, such as a thermostat, for sensing a temperature. Here, the temperature may be an output value according to temperature control of the heating system.

For example, the temperature sensor may be mounted in a room to be heated to sense the temperature of the room. In addition, when the heating system performs temperature control, the temperature sensor may sense the temperature of the room changed according to temperature control of the heating system.

Meanwhile, the operation unit may include a valve for controlling the flow rate of gas or liquid for temperature control of the heating system. For example, the heating system may include a heating pipe for delivering gas or liquid to the room and a flow rate control valve mounted in the heating pipe to control the flow rate of the gas or liquid. In addition, the heating system may include an operation unit (e.g., a motor) for controlling the opening degree of the valve.

Meanwhile, the artificial intelligence unit may update a control function based on reinforcement learning and control the opening degree of the valve according to a control value output from the updated control function. For example, the artificial intelligence unit may perform reinforcement learning such that the sensed temperature follows a base line. In this case, the base line may include a first line indicating change in the sensed temperature according to maximum control of the heating system.

For example, if a control value of 100 percent is output by the control function, the heating system may perform control corresponding to the control value of 100 percent, that is, control for opening the valve 100 percent. In this case, the first line may refer to change in temperature of the room when the valve is opened 100 percent. In addition, the base line may include a second line matching a target temperature which is a set value of the heating system.

Here, the second line may be a target value that the output value reaches when the heating system performs heating. For example, if the current temperature of the room to be heated is 24° C. and a command for increasing the temperature to 30° C. is received, the heating system may perform operation for increasing the temperature to 30° C. In this case, the artificial intelligence unit may set a base line including a first line indicating change in temperature at the time of maximum control of the heating system and a second line formed to match 30° C.

Further, the artificial intelligence unit may perform reinforcement learning such that the sensed temperature follows the base line, thereby updating a control function. Furthermore, the artificial intelligence unit may control the opening degree of the valve according to the control value output from the updated control function.

Specifically, in the heating system, the current value may be a current temperature and the set value may be a target temperature. In addition, the artificial intelligence unit may input a difference between the current value and the set value to calculate a control value. In addition, the artificial intelligence unit may control the opening degree of the valve according to the calculated control value. Meanwhile, the artificial intelligence unit may perform reinforcement learning using a pattern of a temperature in an environment in which the heating system is mounted. Here, the pattern of the temperature may indicate how the temperature of the room to be heated is changed when the valve is opened by a certain degree. The pattern of the temperature may be acquired by learning the temperature according to the control information of the heating system and the control information of the environment, in which the heating system is mounted, by a recurrent neural network (RNN). Specifically, data learned by the recurrent neural network (RNN) may be time-series data of the temperature according to the opening degree of the valve and the opening degree of the valve in the room to be heated.

In this case, the recurrent neural network (RNN) may acquire the pattern of the output value by learning data over a predetermined period of time. The learned recurrent neural network may be installed in a storage unit included in the artificial intelligence device.

In the present disclosure, the artificial intelligence unit may be used interchangeably with one or more hardware central processing units, one or more hardware microprocessors, one or more hardware processors, a computer terminal including one or more processors and a memory having instructions stored thereon, and the like.

Figure 10:
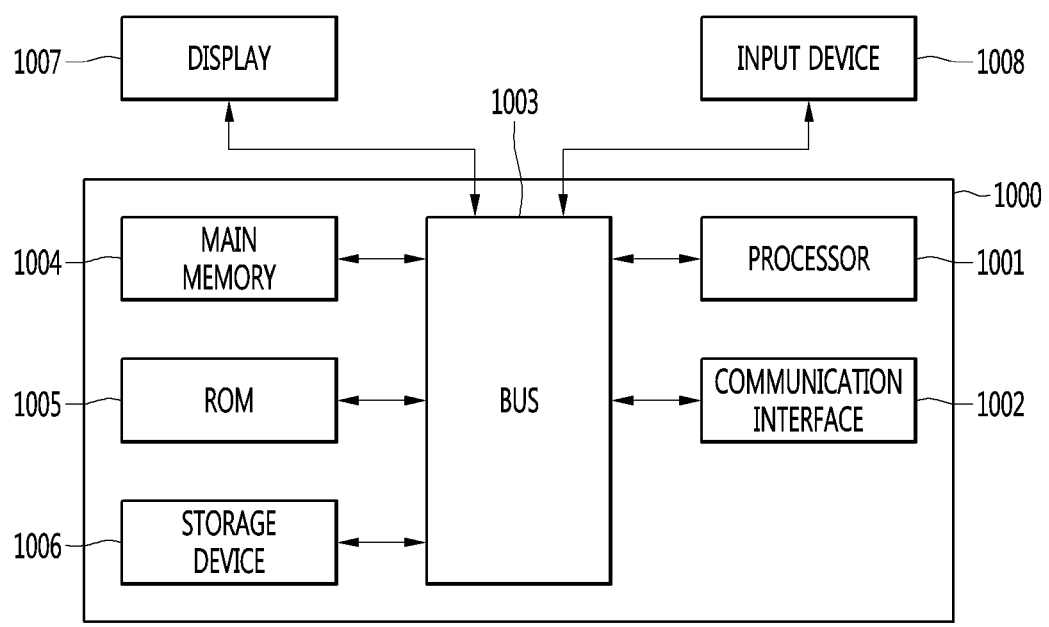
FIG. 10 is a diagram of an apparatus implemented according to an embodiment of the present disclosure.

For example, referring now to FIG. 10, an illustration of an example computer 1000 is provided which may be used to embody, implement, execute, or perform embodiments of the present disclosure, including the artificial intelligence unit, the control systems, and the control center. It will also be understood that the various aspects of the present disclosure may be embodied or implemented in or as components of computer 1000, such as one or more of the processor 1001.

In selected embodiments, the computer 1000 may include a bus 1003 (or multiple buses) or other communication mechanism, a processor 1001, processor internal memory 1001a, main memory 1004, read only memory (ROM) 1005, one or more additional storage devices 1006, and/or a communication interface 1002, or the like or sub-combinations thereof. The embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In all embodiments, the various components described herein may be implemented as a single component, or alternatively may be implemented in various separate components.

A bus 1003 or other communication mechanism, including multiple such buses or mechanisms, may support communication of information within the computer 1000. The processor 1001 may be connected to the bus 1003 and process information, and more than one processor 1001 may be provided. In some embodiments, each processor 1001 may be dedicated to certain calculations related to certain tasks, such as graphics processing, machine learning and artificial intelligence, and the like. Thus, in selected embodiments, the processor 1001 may be a specialized or dedicated microprocessor configured to perform particular tasks in accordance with the features and aspects disclosed herein by executing machine-readable software code defining the particular tasks.

Main memory 1004 (e.g., random access memory—or RAM—or other dynamic storage device) may be connected to the bus 1003 and store information and instructions to be executed by the processor 1001. Processor 1001 may also include internal memory 1001a, such as CPU cache implemented by SRAM, for storing data used for executing instructions. Utilization of internal memory 1001a may optimize data and memory management by reducing memory bandwidth usage with main memory 1004. Although FIG. 10 depicts internal memory 1001a as a component of processor 1001, it will be understood that embodiments are included wherein internal memory 1001a is a separate component apart from processor 1001. Main memory 1004 may also store temporary variables or other intermediate information during execution of such instructions.

ROM 1005 or some other static storage device may be connected to a bus 1003 and store static information and instructions for the processor 1001. An additional storage device 1006 (e.g., a magnetic disk, optical disk, memory card, or the like) may be connected to the bus 1003. The main memory 1004, ROM 1005, and the additional storage device 1006 may include a non-transitory computer-readable medium holding information, instructions, or some combination thereof, for example instructions that when executed by the processor 1001, cause the computer 1000 to perform one or more operations of a method as described herein. A communication interface 1002 may also be connected to the bus 1003. A communication interface 1002 may provide or support two-way data communication between a computer 1000 and one or more external devices (e.g., other devices contained within the computing environment).

In selected embodiments, the computer 1000 may be connected (e.g., via a bus) to a display 1007. The display 1007 may use any suitable mechanism to communicate information to a user of a computer 1000. For example, the display 1007 may include or utilize a liquid crystal display (LCD), light emitting diode (LED) display, projector, or other display device to present information to a user of the computer 1000 in a visual display. One or more input devices 1008 (e.g., an alphanumeric keyboard, mouse, microphone, stylus pen) may be connected to the bus 1003 to communicate information and commands to the computer 1000. In selected embodiments, one input device 1008 may provide or support control over the positioning of a cursor to allow for selection and execution of various objects, files, programs, and the like provided by the computer 1000 and displayed by the display 1007.

The computer 1000 may be used to transmit, receive, decode, display, or the like one or more video files. In selected embodiments, such transmitting, receiving, decoding, and displaying may be in response to the processor 1001 executing one or more sequences of one or more instructions contained in main memory 1004. Such instructions may be read into main memory 1004 from another non-transitory computer-readable medium (e.g., a storage device).

Execution of sequences of instructions contained in main memory 1004 may cause the processor 1001 to perform one or more of the procedures or steps described herein. In selected embodiments, one or more processors in a multi-processing arrangement may also be employed to execute sequences of instructions contained in main memory 1004. Alternatively, or in addition thereto, firmware may be used in place of, or in connection with, software instructions to implement procedures or steps in accordance with the features and aspects disclosed herein. Thus, embodiments in accordance with the features and aspects disclosed herein may not be limited to any specific combination of hardware circuitry and software.

Non-transitory computer readable medium may refer to any medium that participates in holding instructions for execution by the processor 1001, or that stores data for processing by a computer, and comprise all computer-readable media, with the sole exception being a transitory, propagating signal. Such a non-transitory computer readable medium may include, but is not limited to, non-volatile media, volatile media, and temporary storage media (e.g., cache memory). Non-volatile media may include optical or magnetic disks, such as an additional storage device. Volatile media may include dynamic memory, such as main memory. Common forms of non-transitory computer-readable media may include, for example, a hard disk, a floppy disk, magnetic tape, or any other magnetic medium, a CD-ROM, DVD, Blu-ray or other optical medium, RAM, PROM, EPROM, FLASH-EPROM, any other memory card, chip, or cartridge, or any other memory medium from which a computer can read.

In selected embodiments, a communication interface 1002 may provide or support external, two-way data communication to or via a network link. For example, a communication interface 1002 may be a wireless network interface controller or a cellular radio providing a data communication network connection. Alternatively, a communication interface 1002 may comprise a local area network (LAN) card providing a data communication connection to a compatible LAN. In any such embodiment, a communication interface 1002 may send and receive electrical, electromagnetic, or optical signals conveying information.

A network link may provide data communication through one or more networks to other data devices (e.g., other computers such as 1000, or terminals of various other types). For example, a network link may provide a connection through a local network of a host computer or to data equipment operated by an Internet Service Provider (ISP). An ISP may, in turn, provide data communication services through the Internet. Accordingly, a computer 1000 may send and receive commands, data, or combinations thereof, including program code, through one or more networks, a network link, and communication interface 1002. Thus, the computer 1000 may interface or otherwise communicate with a remote server, or some combination thereof.

Embodiments of the present invention provides a learning environment to an artificial intelligence agent whereby the artificial intelligence agent learns a large amount of data, thereby calculating an optimal parameter regardless of various variables for determining the output value.

In addition, embodiments of the present invention provide a clear goal of following the base line to the artificial intelligence agent and the artificial intelligence agent performs learning such that the gap between the base line and the output value is minimized, thereby improving learning ability and learning speed of the artificial intelligence agent.

In addition, embodiments of the present invention may change the reward according to the position of the gap to variously combine various goals according to a degree of importance and to acquire an optimal parameter.

In addition, the first line of the base line indicates the output value according to maximum control of the control system and the second line of the base line indicates the set value of specific operation. According to embodiments of the present invention, a goal of rapidly reaching a set value and a goal of stabilizing a system such as reduction of overshoot or fluctuation of the output value are simultaneously given to the artificial intelligence agent.

In addition, the first line of embodiments of the present invention is set based on the output value by maximum control in an environment in which the control system is installed. That is, the first line is set according to the characteristics of the environment in which the control system is installed, and the artificial intelligence agent performs reinforcement learning in order to follow the first line. Therefore, it may be possible to find an optimal control function suitable for an environment in which the control system is installed.

Further, the pattern of the output value is pre-learned using a recurrent neural network and the pattern of the output value is provided to the agent as an environment, thereby reducing a time required for reinforcement learning.

As discussed, embodiments of the present disclosure may also be embodied as computer readable codes on a computer-readable recording medium. The computer-readable recording medium is any data storage device that can store data which can be thereafter read by a computer system. Examples of possible computer-readable mediums include HDD (Hard Disk Drive), SSD (Solid State Disk), SDD (Silicon Disk Drive), ROM, RAM, CD-ROM, a magnetic tape, a floppy disk, an optical data storage device, etc. The computer may include the controller 180 of the mobile terminal. The above detailed description is therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

What is claimed is:

1. An artificial intelligence device comprising:
a sensor configured to obtain an output value according to control of a control system; and
an artificial intelligence unit comprising one or more processors configured to:
obtain one or more updated parameters of a control function of the control system based on the output value using reinforcement learning, wherein the reinforcement learning is performed such that the output value follows a base line comprising a first line indicating change in the output value according to a maximum control of the control system and a second line indicating a set value corresponding to a target value of the output value when the specific operation is performed; and
update the control function for providing a control value to the control system with the one or more updated parameters.

2. The artificial intelligence device of claim 1, wherein the artificial intelligence unit is further configured to implement feedback control comprising one of proportional—integral (PI) control, proportional—derivative (PD) control, or proportional—integral—derivative (PID) control.

3. The artificial intelligence device of claim 1, wherein the first line represents an average rate of change of the output value according to the maximum control of the control system.

4. The artificial intelligence device of claim 1, wherein the one or more updated parameters are determined as causing the control system to cause a change to the output value to follow the base line by providing a reward based on a gap between the base line and the output value.

5. The artificial intelligence device of claim 1, wherein the one or more processors are further configured to perform the reinforcement learning using a pattern of the output value in an environment in which the control system is installed.

6. The artificial intelligence device of claim 5, wherein the one or more processors are further configured to obtain the pattern of the output value by learning control information of the control system in the environment and corresponding output values using a recurrent neural network.

7. A method for updating a control function, the method comprising:
acquiring an output value according to control of a control system;
obtaining one or more updated parameters of a control function of the control system based on the output value using reinforcement learning, wherein the reinforcement learning is performed such that the output value follows a base line comprising a first line indicating change in the output value according to a maximum control of the control system and a second line indicating a set value corresponding to a target value of the output value when the specific operation is performed; and updating the control function for providing a control value to the control system with the one or more updated parameters.

8. The method according to claim 7, further comprising implementing feedback control comprising one of proportional-integral (PI) control, proportional-derivative (PD) control, or proportional-integral-derivative (PID) control.

9. The method according to claim 7, wherein the first line represents an average rate of change of the output value according to the maximum control of the control system.

10. An artificial intelligence based control device for use in a heating, ventilation, air-conditioning (HVAC) system, the control device comprising:
  a sensor configured to sense a temperature which is an output value according to control of the HVAC system;
  a valve configured to control a flow rate of gas or liquid for temperature control of the HVAC system; and
  an artificial intelligence unit comprising one or more processors configured to:
  update a control function based on the output value using reinforcement learning, wherein the reinforcement learning is performed such that the output value follows a base line comprising a first line indicating change in the output value according to a maximum control of the control system and a second line indicating a set value corresponding to a target value of the output value when the specific operation is performed; and
  control the valve to open or close according to a control value output from the updated control function.

11. The control device according to claim 10, wherein the second line represents a target temperature of the heating system.

12. The control device according to claim 10, wherein the one or more processors are further configured to perform the reinforcement learning using a pattern of the temperature in an environment in which the HVAC system is mounted.

13. The control device according to claim 12, wherein the pattern of the temperature is acquired by learning control information of the heating system in the environment and the corresponding temperatures using a recurrent neural network.

* * * * *